US008463778B2

(12) United States Patent
Tuttle et al.

(10) Patent No.: US 8,463,778 B2
(45) Date of Patent: *Jun. 11, 2013

(54) SYSTEMS AND METHODS FOR SORTING SEARCH RESULTS

(75) Inventors: Timothy D. Tuttle, San Francisco, CA (US); Adam L. Beguelin, San Carlos, CA (US); Peter F. Kocks, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/051,454

(22) Filed: Mar. 18, 2011

(65) Prior Publication Data
US 2011/0173212 A1 Jul. 14, 2011

Related U.S. Application Data

(63) Continuation of application No. 12/020,983, filed on Jan. 28, 2008, now Pat. No. 7,912,836, which is a continuation of application No. 11/286,268, filed on Nov. 22, 2005, now Pat. No. 7,370,381.

(60) Provisional application No. 60/630,552, filed on Nov. 22, 2004.

(51) Int. Cl.
*G06F 7/00* (2006.01)
*G06F 17/30* (2006.01)

(52) U.S. Cl.
USPC .......................................... 707/727; 707/748

(58) Field of Classification Search
USPC ....... 707/999.001–999.003, 999.01, 999.107, 707/705–706, 723, 727, 748
See application file for complete search history.

(56) References Cited

U.S. PATENT DOCUMENTS

| | | | |
|---|---|---|---|
| 6,282,549 B1 | 8/2001 | Hoffert et al. | |
| 6,421,675 B1* | 7/2002 | Ryan et al. | 1/1 |
| 6,665,658 B1 | 12/2003 | DaCosta et al. | |
| 6,978,263 B2* | 12/2005 | Soulanille | 1/1 |
| 7,370,381 B2 | 5/2008 | Tuttle et al. | |
| 7,499,948 B2 | 3/2009 | Smith et al. | |
| 7,536,459 B2 | 5/2009 | Johnson et al. | |
| 7,912,836 B2 | 3/2011 | Tuttle et al. | |
| 7,987,172 B1* | 7/2011 | Carver | 707/709 |
| 8,001,118 B2* | 8/2011 | Dean et al. | 707/731 |
| 2002/0052928 A1 | 5/2002 | Stern et al. | |
| 2002/0116494 A1 | 8/2002 | Kocol | |
| 2002/0120609 A1 | 8/2002 | Lang et al. | |
| 2002/0165849 A1* | 11/2002 | Singh et al. | 707/1 |
| 2003/0120654 A1* | 6/2003 | Edlund et al. | 707/7 |

(Continued)

OTHER PUBLICATIONS

Smith, John R and Chang, Shih-Fu, "Visually Searching the Web for Content", Jul. 1998, IEEE Computer Society Press, IEEE MultiMedia, vol. 4, Issue 3, ISSN 1070-986X pp. 12-20.

*Primary Examiner* — Robert Beausoliel, Jr.
*Assistant Examiner* — Susan F Rayyan
(74) *Attorney, Agent, or Firm* — Keller Jolley Preece

(57) ABSTRACT

A computer-implemented method is provided for ranking files from an Internet search. In one embodiment, the method comprises sorting search result items based on a first clickthru popularity and a second clickthru popularity. The first clickthru popularity may be derived from clickthrus that occurred during a first time period. The second clickthru popularity may be derived from clickthrus that occurred during a second time period that is different from the first time period.

20 Claims, 5 Drawing Sheets

U.S. PATENT DOCUMENTS

| | | |
|---|---|---|
| 2003/0135490 A1 | 7/2003 | Barrett et al. |
| 2004/0039734 A1 | 2/2004 | Judd et al. |
| 2004/0059809 A1 | 3/2004 | Benedikt et al. |
| 2005/0071741 A1 | 3/2005 | Acharya et al. |

* cited by examiner

Truveo

Top Picks | News | Sports | Movies | More | Favorites | Recently Viewed | Red Sox | Search | Advanced Search Preferences | Help

Search Results

Results 1 - 10 of 24
next ➡

Orioles 9 @ Red Sox 7  Sat 9/25  342 kbps  1 min
September 25: Pinch-hitter Jose Leon snapped an eighth-inning tie with a two-run single, but it was two insurance runs in the ninth that proved to be the difference.
MSN Video

Yankees 6 @ Red Sox 4  Fri 9/24  342 kbps  1 min
September 24: By beating the Red Sox on their home turf, the Yankees reduced their magic number for clinching the American League East to four.
MSN Video

Yankees 5 @ Red Sox 12  Thu 9/23  342 kbps  1 min
September 23: Thanks to Doug Mirabelli's four RBIs and a seven-run eighth inning, the Red Sox reduced their postseason magic number to three on Saturday night.
MSN Video

Red Sox 4 @ Yankees 14  Mon 9/20  342 kbps  0 min
September 20: Jon Lieber took a no-hitter into the seventh inning, but the game was decided early after the Yankees scored nine runs over the first two innings.
MSN Video

Red Sox 1 @ Yankees 11  Sun 9/19  342 kbps  1 min
September 19: Pedro Martinez got lit up as the Yanks clobbered the Sox, distancing themselves from Boston even further in the race for the AL East.
MSN Video

Orioles 3 @ Red Sox 6  Sat 9/18  342 kbps  1 min
September 18: Boston bounced back from their dismal weekend series in New York by... dropping their 3rd straight game. This time it was Baltimore roughing up the BoSox.
MSN Video

Devil Rays 6 @ Red Sox 8  Wed 9/15  342 kbps  1 min
September 15: Manny Ramirez's sac fly in the sixth helped Boston finally hook a feisty Devil Rays squad that erased three leads Wednesday. The win kept the Red Sox four games back of New York. Kevin Millar contributed a two-run homer.
MSN Video

Sponsored Links

Red Sox items on eBay
Great deals and amazing selection Red Sox items. Visit eBay Sports, the world's online sports store.
www.ebay.com

Red Sox
Thousands of Red Sox items for all ages located across from Fenway Park. Official jerseys, hats, t-shirts and memorabilia. We ship worldwide.
www.thesouveniretore.com

Buy Red Sox Tickets
Razorgator.com offers quality pricing, selection and service to sold-out and hard to find events. Razorgator has been selling premium tickets since 1958.
www.razorgator.com

Boston Red Sox Tickets with Free FedEx
Specialists in Red Sox tickets since 1968. We've got a huge selection of tickets, many at reduced prices. Free two-day FedEx shipping.
www.ticketsnortheast.com

Awesometickets.net - Red Sox Tickets
Awesome Tickets carries a wide variety of quality seats to all Red Sox home and away games. Shop safely 24/7 on our secure Web site or order over the phone.
awesometickets.net — Powerful Recommendation Engine Provides Suggestions Based On Popularity, Freshness, And User Preferences — Standard Keyword Search As Well As Sophisticated Metadata-Based Parametric Search — Results Include High-Quality Video Content That Can Be Found On No Other Search Engine — Results Include The Latest Videos For Time-Sensative Content Like News And Sports

*FIG. 4*

SYSTEMS AND METHODS FOR SORTING SEARCH RESULTS

CROSS-REFERENCE TO RELATED APPLICATIONS

This application is a continuation of U.S. patent application Ser. No. 12/020,983, filed Jan. 28, 2008; which is a continuation of U.S. patent application Ser. No. 11/286,268, filed Nov. 22, 2005, now U.S. Pat. No. 7,370,381; which claims priority to U.S. Provisional Application Ser. No. 60/630,552 filed on Nov. 22, 2004, each of these applications are fully incorporated herein by reference for all purposes.

BACKGROUND

1. Technical Field

The technical field relates to a scheme for ranking results, and more specifically, to a rating scheme to rank video search results by a number of factors.

2. Background Art

Standard web crawlers were originally designed for web pages where the bulk of useful information about the page was contained in an HTML text file. In web pages today, it is increasingly common for the useful information about the page to be contained in a variety of different files, which are all assembled in the browser to create the complete application. Because of this, standard web crawlers are unable to find much of the multimedia and video content available on modern web pages.

Even for the video content that is found by standard web crawlers, the result of the search often provides video content that may be out-of-date, poor quality, or not relevant to a search query from a user. Traditional search engines lack the ability to efficiently and more accurately organize these search results. There is a need for improved techniques for organizing the results from such searches to provide higher accuracy and greater ease of use for the user.

SUMMARY

The present invention provides solutions for at least some of the drawbacks discussed above. Specifically, some embodiments of the present invention provide a Ranking Engine that is a rating scheme used in the Truveo Search Engine to rank video search results by factors such as, but not limited to, popularity, timeliness and/or user preferences. It enables the Truveo Search Engine to provide highly targeted search results to users. It is designed to operate effectively in the absence of any user input, however, it uses any provided user input to improve the accuracy of the search results. In one aspect, the present invention provides memory-based reasoning algorithms to ensure highly accurate search results with minimal user input. Extensive metadata enables advanced parametric search when desired. At least some of these and other objectives described herein will be met by embodiments of the present invention.

In one embodiment of the present invention, a computer-implemented method is provided for a ranking engine. The method comprises assigning a score to each file or record based on at least the following factors: recency, editorial popularity, and clickthru popularity. The files are organized based on the assigned scores.

In another embodiment of the present invention, a computer-implemented method is provided for a ranking engine. The method comprises assigning a score to each file or record based on at least the following factors: recency, editorial popularity, clickthru popularity, favorites metadata, and favorites collaborative filtering. The files are organized based on the assigned scores.

In yet another embodiment of the present invention, a computer system is provided that comprises of a ranking engine having programming code for displaying results of a search query based on scores, wherein the scores for files found in the search are based on at least the following factors: recency, editorial popularity, and clickthru popularity.

In a still further embodiment of the present invention, a computer system is provided that comprises of a ranking engine having programming code for displaying results of a search query based on scores, wherein the scores for files found in the search are based on at least the following factors: recency, editorial popularity, popularity, favorites metadata, and favorites collaborative filtering.

The files may be media files, video files, video streams, or the like. The editorial popularity may be weighted between 1 and 0 and is based on at least one of the following: Neilsen ratings, known brand names, website popularity (e.g. Alexa ranking), or the judgment of a professional or corporation with expertise in online media. In one embodiment, the weighting of favorites metadata is $R_{md}=0$ if no matches are found or 1 if a keyword field in the metadata of the file matches any favorite titles in a user's favorite titles file, any favorite people in a user's favorite people file, or any keyword in a user's favorite keywords file.

In yet another embodiment of the present invention, a computer-implemented method is provided for organizing a collection of files from an Internet search. The method comprises assigning a score to each file based on favorites collaborative filtering $W_{cf}R_{cf}$ and at least one of the following factors: recency $W_r R_r$, editorial popularity $W_e R_e$, clickthru popularity $W_c R_c$, and favorites metadata $W_{md}R_{md}$. The files are organized based on the assigned scores.

In yet another embodiment of the present invention, a computer system is provided that comprises of a ranking engine having programming code for displaying results of a search query based on scores, wherein the scores for files found in the search are based on favorites collaborative filtering $W_{cf}R_{cf}$ and at least one of the following factors: recency $W_r R_r$, editorial popularity $W_e R_e$, clickthru popularity $W_c R_c$, and favorites metadata $W_{md}R_{md}$.

For any of the embodiments herein, the files may be media files, video files, video streams, or the like. Optionally, the editorial popularity may be weighted between 1 and 0 and is based on at least one of the following: Neilsen ratings, known brand names, website popularity (e.g. Alexa ranking), or the judgment of a professional or corporation with expertise in online media. In one embodiment, the weighting of favorites metadata is $R_{md}=0$ if no matches are found or 1 if a keyword field in the metadata of the file matches any favorite titles in a user's favorite titles file, any favorite people in a user's favorite people file, or any keyword in a user's favorite keywords file.

A further understanding of the nature and advantages of the invention will become apparent by reference to the remaining portions of the specification and drawings.

BRIEF DESCRIPTION OF THE DRAWINGS

FIG. 4 shows one embodiment of a display showing results from a search query.

DETAILED DESCRIPTION

It is to be understood that both the foregoing general description and the following detailed description are exemplary and explanatory only and are not restrictive of the invention, as claimed. It may be noted that, as used in the specification and the appended claims, the singular forms "a", "an" and "the" include plural referents unless the context clearly dictates otherwise. Thus, for example, reference to "a crawler" may include multiple crawlers, and the like. References cited herein are hereby incorporated by reference in their entirety, except to the extent that they conflict with teachings explicitly set forth in this specification.

Figure 1:
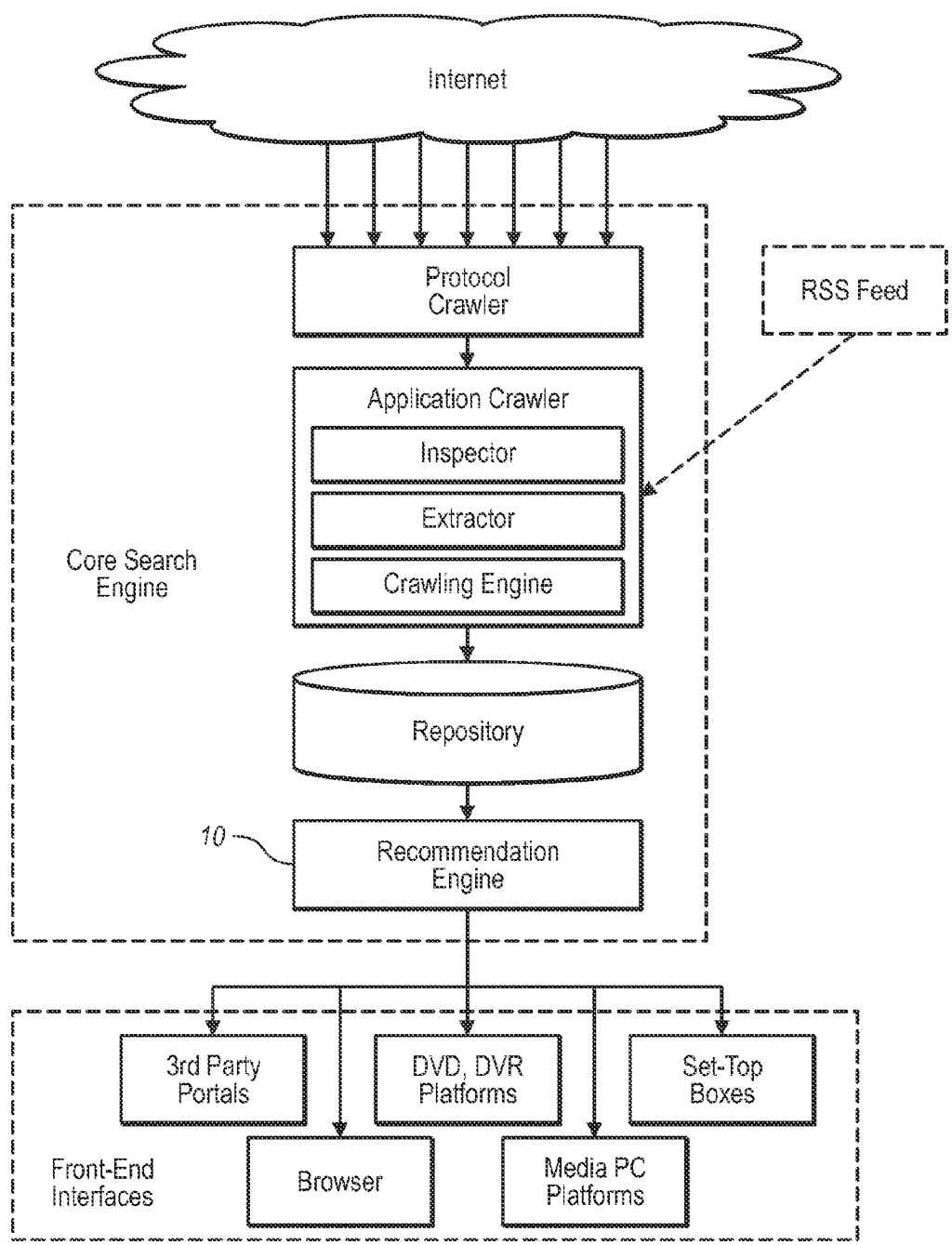
FIG. 1 shows a schematic of one embodiment of the present invention.

Referring now to FIG. 1, a schematic is shown of the Truveo Search Engine which is configured for use with the present ranking scheme. As seen in FIG. 1, the search engine may include a recommendation engine 10. The engine 10 may use reasoning algorithms to provide highly accurate search results with minimal user input. In one embodiment, the recommendation engine may use a ranking scheme as set forth below.

Truveo Ranking Scheme:

$$R_T = \underbrace{W_r R_r}_{\text{Term 1}} + \underbrace{W_e R_e}_{\text{Term 2}} + \underbrace{W_c R_c}_{\text{Term 3}} + \underbrace{W_{md} R_{md}}_{\text{Term 4}} + \underbrace{W_{cf} R_{cf}}_{\text{Term 5}}$$

= 0 if Favorites not set where: $0 < R_i < 1$ and: $1 = W_r + W_e + W_c + W_{md} + W_{cf}$ $\Rightarrow 0 < R_T < 1$ Term 1: Recency Ranking:

$$R_r = \begin{cases} 1 - \frac{1}{t_e}(d_c - d_F), & \text{For } (d_c - d_F) < t_e \\ 0, & \text{For } (d_c - d_F) > t_e \end{cases}$$

where:

$t_e$=expiration time (perhaps ~30 days)

$d_c$=current date $d_F$=date found

Figure 2:
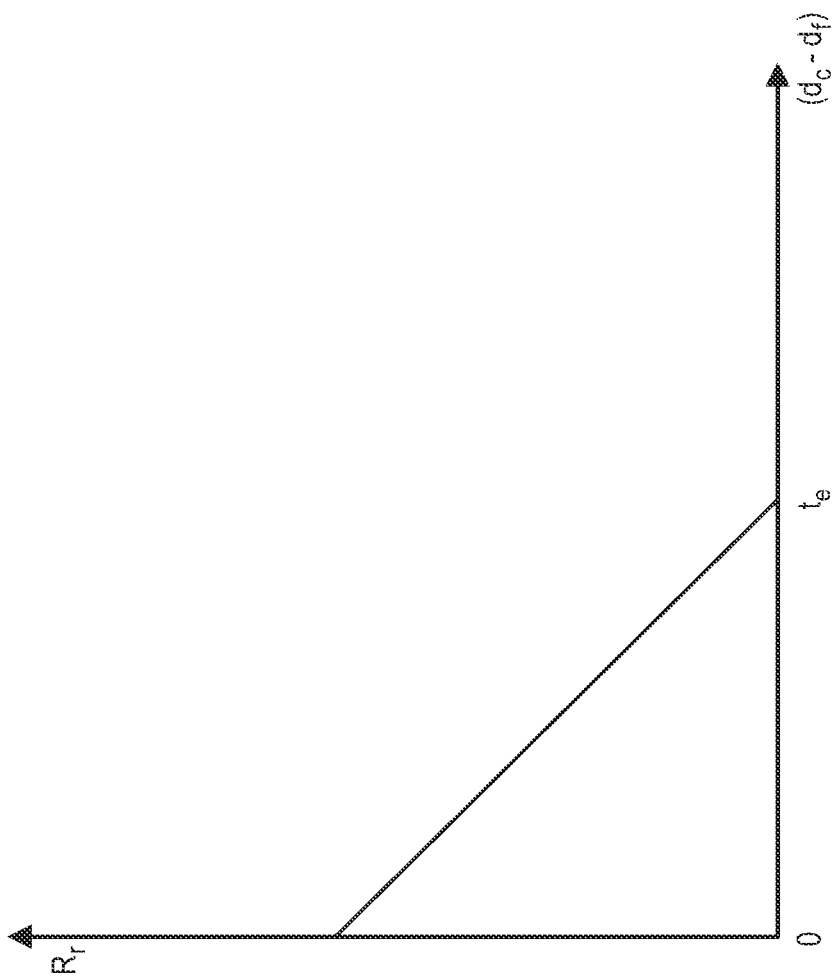
FIG. 2 is a graph showing variables plotted for recency ranking according to the present invention.

This yields the relationship as shown in FIG. 2.

Term 2: Editorial Popularity Ranking:

Each database entry (e.g., item) is assigned a value for 'EDITORIAL_RANK', based on how popular the content is expected to be. This could be based on expected viewership for known brand names, previous Neilsen ratings, etc. The most popular content should approach $R_e=1$. Unknown or unpopular content should approach $R_e=0$. Optionally, the editorial popularity rank may also have a time decay component to give weight or more weight to more recent popularity information.

Term 3: Clickthru Popularity Ranking:

$R_c = W_{cpm} R_{cpm} + W_{cph} R_{cph} + W_{cpd} R_{cpd}$ where:

$R_{cpm}$ = clicks per minutes ranking = $\frac{CPM}{\text{Max}(cpm)}$, $(0 < R_{cpm} < 1)$ over all items $R_{cph}$ = clicks per hour ranking = $\frac{CPH}{\text{Max}(cph)}$, $(0 < R_{cph} < 1)$ over all items $R_{cpd}$ = clicks per day ranking = $\frac{CPD}{\text{Max}(cpd)}$, $(0 < R_{cpd} < 1)$ and over all items $1 = W_{cpm} + W_{cph} + W_{cpd}$.

To implement the clickthru popularity rating, the following fields need to be added to the video data table:

| | |
|---|---|
| TOTAL_CLICKS = | the running tally of clicks that this item has seen since DATE_FOUND |
| CPM = | clicks per minute |
| CPM_COUNTER_BUFFER = | running tally of clicks on this item since CPM_LAST_CALC |
| CPM_LAST_CALC = | the time when CPM was last calculated and CPM_COUNT_BUFFER was flushed |

Similarly: CPH, CPH_COUNT_BUFFER, CPH_LAST_CALL for clicks-per-hour, and CPD, CPD_COUNT_BUFFER, CPD_LAST_CALC for clicks-per-day.

These fields can be calculated and update as follows:

For every user with cookies enabled, each clicked item is stored anonymously in a cookie. Upon a subsequent request to the Truveo search engine (during that same session), the clickthru data in the cookie is processed as follows:

For every item clicked, increment TOTAL_CLICKS, CPM_COUNT_BUFFER, CPH_COUNT_BUFFER, and CPD_COUNT_BUFFER by 1.

For CPM, if CURRENT_TIME−CPM_LAST_CALL>1 minute,

CPM=CPM_COUNT_BUFFER/(CURRENT_TIME−CPM_LAST_CALC)

reset CPM_COUNT_BUFFER to 0 set CPM_LAST_CALC to CURRENT_TIME

Similarly for CPD and CPH

Once this is complete, the user's browser cookie may be flushed to eliminate all cached clickthrus.

Term 4: Favorites Metadata Ranking:

Note that if the user has not registered for an account, this Ranking, $R_{md}$, is zero.

If the user does have a valid account, $R_{md}$ will be determined as follows: User FAVORITES METADATA is stored in 3 database tables: FAVORITE_TITLES, FAVORITE_PEOPLE, FAVORITE_KEYWORDS.

For a Given Video Data Item:

If any entry in FAVORITE_TITLES matches any part of the TITLE field or the KEYWORDS Field, $R_{md}=1$.

—OR—

If any entry in the FAVORITE_PEOPLE table matches any part of any of the fields: ACTOR, DIRECTOR, KEYWORDS, PRODUCER, WRITER, LONG_DESCRIPTION, SHORT_DESCRIPTION, $R_{md}=1$

—OR—

If any entry in the FAVORITE_KEYWORDS table matches any part of any of the fields: ACTOR, CATEGORY, DIRECTOR, GENRE, HOST_SITE_NAME, HOST_SITE_URL, KEYWORDS, LONG_DESCRIPTION, SHORT_DESCRIPTION, PRODUCER, TITLE, WRITER, $R_{md}=1$.

Otherwise, $R_{md} = 0$

Therefore: $R_{md} = \begin{cases} 0, & \text{if no metadata match} \\ 1, & \text{if metadata match} \end{cases}$ Note: Be sure to Filter matches on trivial metadata entries like single characters, articles or whitespace characters.

A user's favorites may be determined by, but not limited to, providing a mechanism for the user to indicate their favorite videos, recording the video items they select to view (e.g. through the use of cookies), or by recording the video items they choose to forward via e-mail to other people. The FAVORITE_TITLE, FAVORITE_PEOPLE, and FAVORITE_KEYWORDS tables are populated for the user by extracting the appropriate meta data from the video record of the indicated favorite video.

Optionally, embodiments of the present application may also include the use of a unique cookie to identify an anonymous user as a substitute for a user account.

Term 5: Favorites Collaborative Filtering Ranking:

A listing of the Favorite Items (video data records) for each user is stored in the database table FAVORITE_ITEMS.

Note that, if the user has not registered for an account, this ranking, $R_{cf}$, is zero.

If the user does have a valid account, $R_{cf}$ is determined as follows:

First, calculate the distance between user i and all other users, j:

$$D_{i,j} = \text{distance between user } i + j = \frac{n_i - n_{i,j}}{n_i} = 1 - \frac{n_{i,j}}{n_i}$$

where $n_i$ is the number of Favorite items user i has stored, and $n_{i,j}$ is the number of user i's Favorites that match Favorites of user j.

Note that if all of user i's Favorites match a Favorite of user j, then $D_{i,j}=0$. If none match, $D_{i,j}=1$.

Similarly, a measure of the similarity between user i and j can be calculated as follows:

$S_{i,j}$=similarity between users $i$ and $j$=$(1-D_{i,j})$=

Note: $S_{i,j}=1$ when the users are completely similar, and 0 when there are no similar Favorites between users.

We can now select the K-Nearest Neighbors to user i based on the similarity ranking. For example, assuming user i has three Favorite items:

For: User i
Favorites: ITEMID=103 ITEMID=107 ITEMID=112
⇒ $n_i=3$

K-Nearest Neighbors can be selected as follows:

| User ID (j) | $n_{i,j}$ | $D_{i,j}$ | $S_{i,j}$ | Favorite Items ID |
|---|---|---|---|---|
| 1 | 1 | 0.66 | 0.33 | 101, 102, 103, 110 |
| 2 | 2 | 0.33 | 0.66 | 103, 104, 105, 106, 107 |
| 3 | 0 | 1 | 0 | 101 |
| 4 | 3 | 0 | 1 | 103, 104, 107, 112 |
| 5 | 2 | 0.33 | 0.66 | 106, 107, 109, 110, 111, 112 |
| 6 | 1 | 0.66 | 0.33 | 103, 104 |

Reranking the Users by Decreasing Similarity:

| | User ID | $S_{i,j}$ | Favorite Items Not Already Stored by User i |
|---|---|---|---|
| K-Nearest Neighbors, where K = 4 | 4 | 1 | 104 |
| | 2 | 0.66 | 104, 105, 106 |
| | 5 | 0.66 | 106, 109, 110, 111 |
| | 1 | 0.33 | 101, 102, 110 |
| | 6 | 0.33 | 104 |
| | 3 | 0 | 101 |

From this ordered list, the K-Nearest Neighbors are the first K items.

From the K-Nearest Neighbors, we can also determine a popularity rating for each new Favorite item. This can be calculated from the fraction of the K neighbors that have item l in their Favorites list.

Specifically:

KNN = K-Nearest Neighbors (for K = 4):

| | User ID | Similarity to User i | New Favorite Items |
|---|---|---|---|
| K-Nearest Neighbors, where K = 4 | 4 | 1 | 104 |
| | 2 | 0.66 | 104, 105, 106 |
| | 5 | 0.66 | 106, 109, 110, 111 |
| | 1 | 0.33 | 101, 102, 110 |

$$|P_l| = |\text{popularity of item } l| = \frac{\text{number of occurrences of item } l}{K}$$ among K-Nearest Neighbors to user i Therefore,

| Item ID | Users with This Item | $P_l$ | $S_{max,l}$ |
| --- | --- | --- | --- |
| 104 | 4, 2, 1 | 0.75 | 1 |
| 106 | 2, 5 | 0.5 | 0.66 |
| 110 | 5, 1 | 0.5 | 0.66 |
| 105 | 2 | 0.25 | 0.66 |
| 109 | 5 | 0.25 | 0.66 |
| 111 | 5 | 0.25 | 0.66 |
| 101 | 1 | 0.25 | 0.33 |
| 102 | 1 | 0.25 | 0.33 |

Where: $S_{max,l}$=Maximum similarity across all users with item l in their Favorites list Note: Popularity=1 when all KNN contain item l, and $P_l=0$ when no KNN contain item l.

Now, we can determine a ranking for every new item in the K-Nearest Neighbors list:

For a Given Item l:

$$R_{cf,l} = W_{sim}(S_{max,l}) + (1-W_{sim})P_l,$$

where:

$W_{sim}$=similarity weighting factor $$= C_{max\ sim}\left(1 - \frac{1}{1+n_i}\right),$$

where:
$0 \leq C_{max\ sim} \leq 1$

In other words, $R_{cf}$ is a weighted sum of the maximum user similarity for item l and the popularity of item l among KNN such that $0 \leq R_{cf} \leq 1$.

The weighting factor is calculated as a function of n, since the relative importance of user similarity, as compared to popularity, increases with the number of specified Favorite items. In other words, if a user has only specified one Favorite item, $n_i=1$, then the similarity will be either 0 or 1, and therefore it does not have much meaning. Therefore, when $n_i$ is small, similarity should be weighed less than popularity.

$C_{max\ sim}$ should be set to the value that the similarity weighting factor should approach as $n_i$ becomes large. A good range is probably $0.3 \leq C_{max\ sim} \leq 0.8$.

Figure 3:
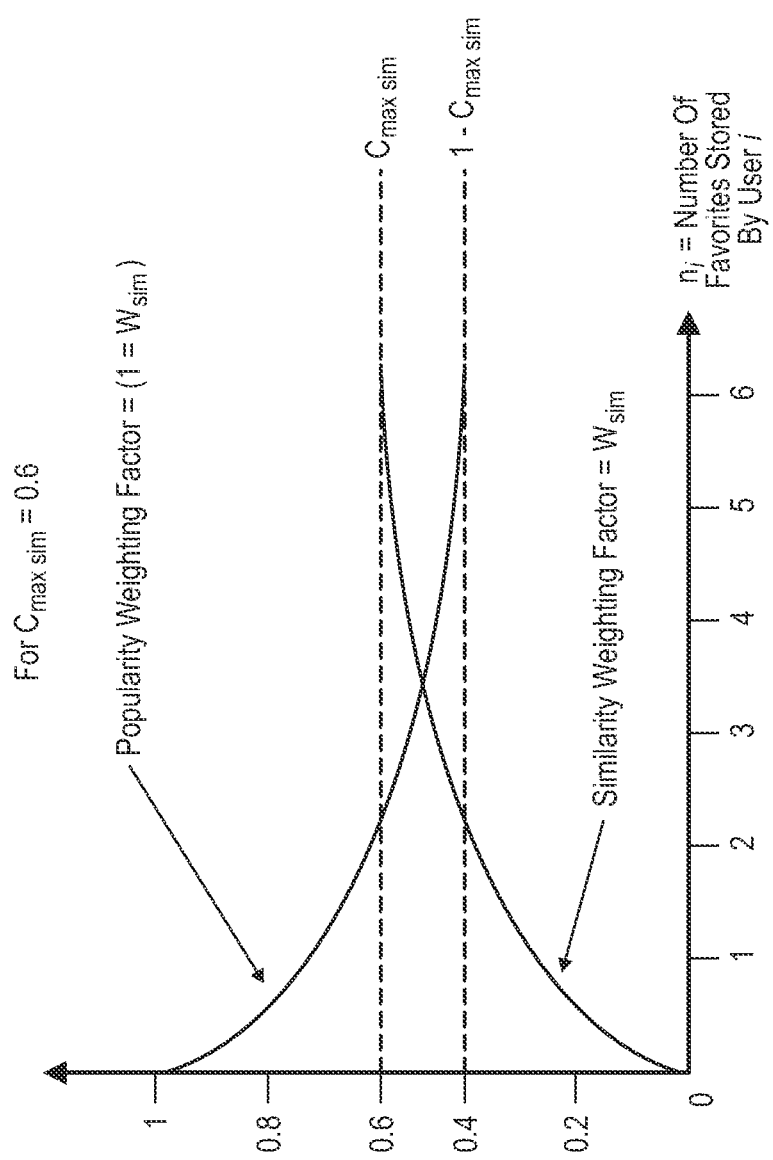
FIG. 3 is a graph showing the relationship of similarity and popularity weighting according to the present invention.

More specifically, the relationship of the similarity and popularity weighting coefficients can be plotted as shown in FIG. 3.

Now, for each new item in KNN, we can calculate the Rank $R_{cf}$:

| Item ID | $P_l$ | $S_{max,l}$ | $R_{cf,l}$ | |
| --- | --- | --- | --- | --- |
| 104 | 0.75 | 1 | 0.86 | Assume $C_{max\ sim}$ = 0.6. |
| 106 | 0.5 | 0.66 | 0.57 | For $n_i = 3$: |
| 110 | 0.5 | 0.66 | 0.57 | $\Rightarrow W_{sim} = 0.45$ |
| 105 | 0.25 | 0.66 | 0.43 | |
| 109 | 0.25 | 0.66 | 0.43 | |
| 111 | 0.25 | 0.66 | 0.43 | |
| 101 | 0.25 | 0.33 | 0.29 | |
| 102 | 0.25 | 0.33 | 0.29 | |

Note:
$R_{cf}$ is always between 0 and 1
If the maximum similarity to user i for item l is 1, and item l is a Favorite of all KNN users, $R_{cf} = 1$ The popularity will never be below 1/KNN, but the similarity can be zero. As a result, $R_{cf}$ will never be 0 unless $C_{max\ sim}=1$ and $n_i \Rightarrow \infty$.

Optionally, embodiments of the present invention may also include a factor for crawl quality in the ranking of search results. By way of non limiting example, Application Crawler results are ranked higher than RSS feed results and RSS feed results higher than results from a generic web crawler.

Referring now to FIG. 4, one embodiment of a user interface for presenting the search results is shown. As seen in FIG. 4, the results may display description of the video content, length of video, time the video was posted, title, website origin, video type, and/or video quality.

Figure 5:
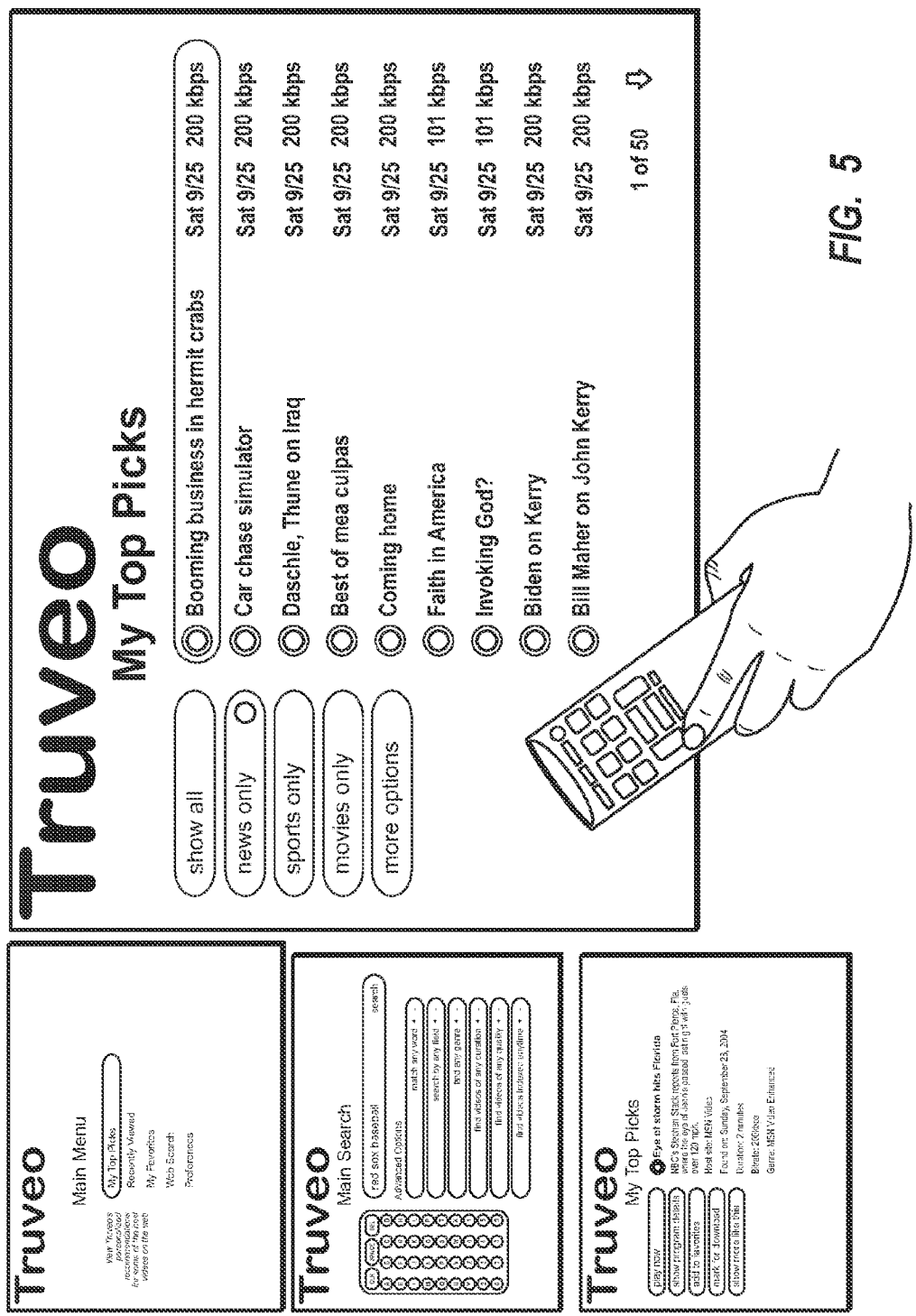
FIG. 5 shows one embodiment of a user interface according to the present invention.

Referring now to FIG. 5, another embodiment of a user interface is shown. This intuitive Media Center user interface may be used to bring web video to a television and other non-PC video devices. In one embodiment, the present invention provides TiVo style recommendations as well as keyword queries. As seen in FIG. 1, the television interface (or Media Center interface) shown in FIG. 5 may access the results from the ranking engine and application crawler. Again, video quality, bit rate, description, and other information may be displayed. Videos may also be categorized based on categories such as, but not limited to, news, sports, movies, and other subjects.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. For example, with any of the above embodiments, the recommendation may use a ranking scheme having only a subset of the ranking terms set forth in the formula. By way of example and not limitation, some embodiments may not include Term 5, the Favorites Collaborative Filtering Ranking. In other embodiments, variations may be made to the present embodiment such as but not limited to computing the ranking terms in a different order or the like. It should be understood that the present ranking scheme is not limited to video files and may be used to rank or organize other types of files. It should be understood that the term "files" as in "video files" may include the delivery of the content of the file in the form of a stream from a server (i.e. a media server).

The publications discussed or cited herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. U.S. Provisional Application Ser. No. 60/630,552 filed Nov. 22, 2004 and U.S. Provisional Application Ser. No. 60/630, 423 filed Nov. 22, 2004, are fully incorporated herein by reference for all purposes. All publications mentioned herein are incorporated herein by reference to disclose and describe the structures and/or methods in connection with which the publications are cited.

Expected variations or differences in the results are contemplated in accordance with the objects and practices of the present invention. It is intended, therefore, that the invention be defined by the scope of the claims which follow and that such claims be interpreted as broadly as is reasonable.

We claim:

1. A system comprising:
a computer having programming code that, when executed by the computer, causes the computer to perform a method comprising:
sorting search result items based on a first clickthru popularity for each search result item and a second clickthru popularity for each search result item;
the first clickthru popularity for each search result item being derived from a first number of clickthrus for the search result item that occurred during a first time period; and
the second clickthru popularity for each search result item being derived from a second number of clickthrus for the search result item that occurred during a second time period that is different from the first time period.

2. The system as recited in claim 1, wherein the first clickthru popularity for each search result item is further derived from a first weight that is applied to the first number of clickthrus for the search result item that occurred during the first time period; and
wherein the second clickthru popularity for each search result item is further derived from a second weight that is applied to the second number of clickthrus for the search result item that occurred during the second time period, the second weight being different from the first weight.

3. The system as recited in claim 1, wherein the first time period is about an hour long; and wherein the second time period is about a day long.

4. The system as recited in claim 1, wherein the first time period is about a minute long; and wherein the second time period is about a day long.

5. The system as recited in claim 1, wherein the first time period is about a minute long; and wherein the second time period is about an hour long.

6. The system as recited in claim 1, wherein the first time period is smaller than the second time period.

7. The system as recited in claim 1, wherein the first time period at least partially overlaps with the second time period.

8. The system as recited in claim 1, wherein the first time period occurs completely within the second time period.

9. The system as recited in claim 1, wherein the first time period does not overlap with the second time period.

10. A method comprising:
by a computer:
sorting search result items based on a first clickthru popularity for each search result item and a second clickthru popularity for each search result item;
the first clickthru popularity for each search result item being derived from a first number of clickthrus for the search result item that occurred during a first time period;
the second clickthru popularity for each search result item being derived from a second number of clickthrus for the search result item that occurred during a second time period that is different from the first time period.

11. The method as recited in claim 10, wherein the first clickthru popularity for each search result item is further derived from a first weight that is applied to the first number of clickthrus for the search result item that occurred during the first time period; and
wherein the second clickthru popularity for each search result item is further derived from a second weight that is applied to the second number of clickthrus for the search result item that occurred during the second time period, the second weight being different from the first weight.

12. The method as recited in claim 10, wherein the first time period is about an hour long; and wherein the second time period is about a day long.

13. The method as recited in claim 10, wherein the first time period is about a minute long; and wherein the second time period is about a day long.

14. The method as recited in claim 10, wherein the first time period is about a minute long; and wherein the second time period is about an hour long.

15. The method as recited in claim 10, wherein the first time period is smaller than the second time period.

16. The method as recited in claim 10, wherein the first time period at least partially overlaps with the second time period.

17. The method as recited in claim 10, wherein the first time period occurs completely within the second time period.

18. The method as recited in claim 10, wherein the first time period does not overlap with the second time period.

19. A computer having programing code that, when executed by the computer, causes the computer to perform a method comprising:
sorting search result items based on a first clickthru popularity for each search result item and a second clickthru popularity for each search result item;
the first clickthru popularity for each search result item being derived from a first number of clickthrus for the search result item that occurred during a first time period; and
the second clickthru popularity for each search result item being derived from a second number of clickthrus for the search result item that occurred during a second time period that is different from the first time period.

20. The computer as recited in claim 19, wherein the first time period occurs completely within the second time period.

* * * * *